UNITED STATES PATENT OFFICE.

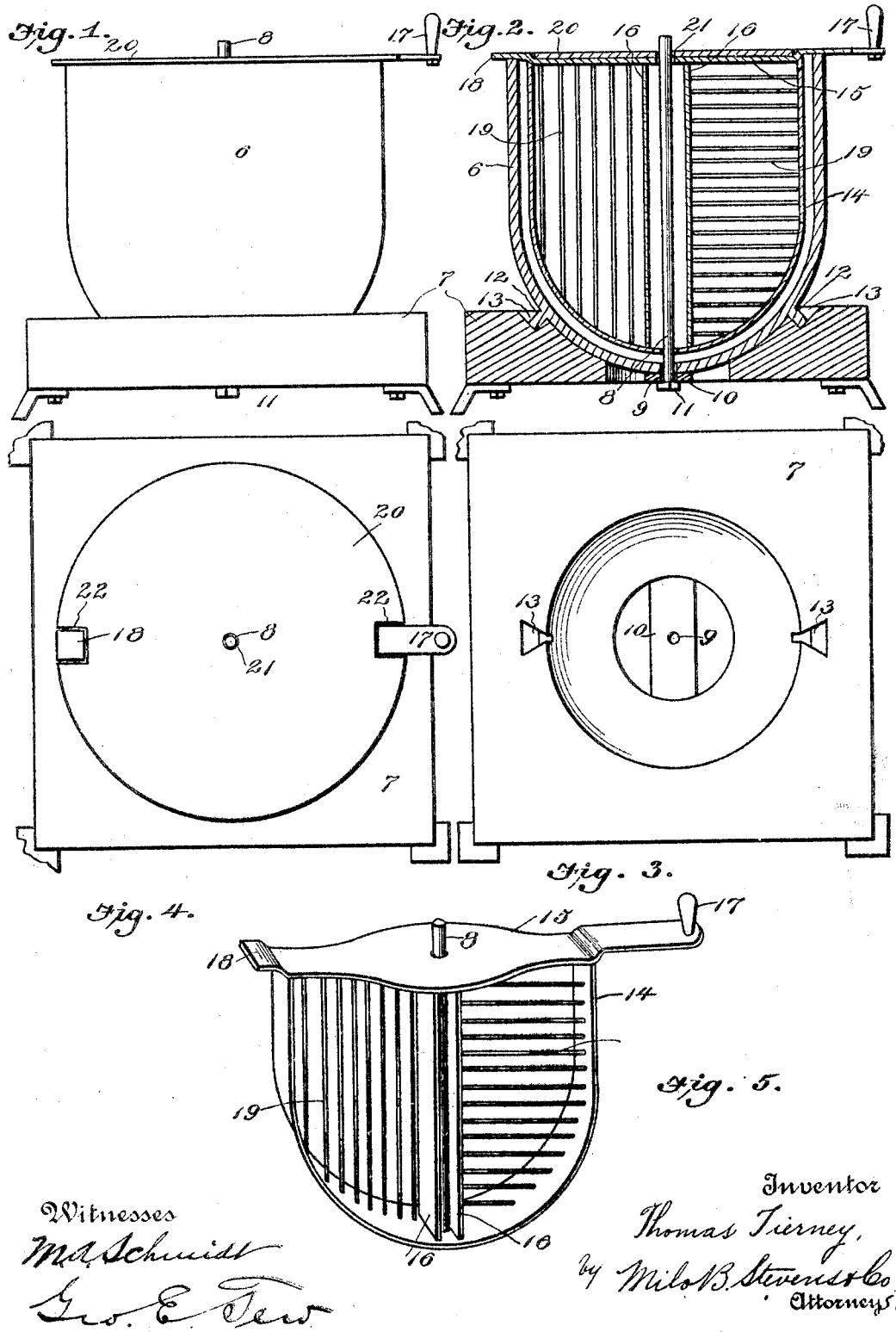

THOMAS TIERNEY, OF CHICAGO, ILLINOIS.

CULINARY UTENSIL.

No. 802,434.     Specification of Letters Patent.     Patented Oct. 24, 1905.

Application filed January 16, 1905. Serial No. 241,315.

*To all whom it may concern:*

Be it known that I, THOMAS TIERNEY, a citizen of the United States, residing at Chicago, in the county of Cook and State of Illinois, have invented new and useful Improvements in Culinary Utensils, of which the following is a specification.

This invention is a beater and cutter for vegetables and other articles of food, and has for its object to produce an improved device of the kind, as more fully described hereinafter.

In the accompanying drawings, Figure 1 is a side elevation of the device. Fig. 2 is a vertical section. Fig. 3 is a plan view of the base on which the bowl is mounted. Fig. 4 is a top plan view. Fig. 5 is a perspective view of the beater removed from the bowl.

Referring specifically to the drawings, 6 indicates a bowl in which the articles to be beaten are placed. This stands upon a dished base 7 and has at the middle a spindle 8, which extends through a hole in the bottom of the bowl and through a hole 9 in the cross-bar 10 on the base, under which the spindle is threaded to receive a nut 11, which holds the spindle in upright position and binds the bowl and base together. The bowl has lugs 12 on the outside which project into sockets 13, formed in the base, whereby the bowl is prevented from turning. The parts may be readily separated by unscrewing the nut 11.

The beater has a frame 14, curved to fit closely the inside of the bowl. Its upper ends are connected by a cross-bar 15, and a pair of vertical bars 16 extend on opposite sides of the spindle from the cross-bar 15 to the bottom of the beater-frame 14. A handle 17 extends outwardly from one end of the said frame and is shaped to extend over the upper edge of the bowl. At the other side is a lug 18, which also projects over the upper edge of the bowl. The frame 14 and cross-bar 15 have holes through which the spindle 8 extends, permitting rotation of the beater-frame on the spindle.

19 indicates wires or thin narrow cutting-strips carried by the beater-frame. On one side of the spindle these are disposed horizontally and on the other side vertically, so that a cutting or beating action in both directions is effected.

A loose cover 20 fits upon the bowl and has at the center a hole 21 for the spindle and at the edge notches 22, through which the handle 17 and lug 18 of the beater project. The cover travels with the beater around on top of the bowl.

The parts are made of metal, the bowl preferably of polished steel, and the other parts of tinned or plated metal suitable for the purpose.

In operation, the potatoes, eggs, or whatever is to be beaten is placed in the bowl and the beater is turned by means of the handle to produce the result desired.

What I claim as new, and desire to secure by Letters Patent, is—

1. A culinary utensil, comprising a bowl having a spindle therein, a beater mounted to rotate on the spindle and having at one side a handle and at the other a lug, which project over the edge of the bowl, and a cover rotatable with the beater-frame, upon the bowl.

2. A culinary utensil, comprising a base having sockets, a bowl upon the base having lugs fitting in the said sockets, a spindle which extends through the bowl and base and is threaded at the lower end to receive a nut to bind the base and bowl together, and a rotary beater on the spindle in the bowl.

In testimony whereof I have signed my name to this specification in the presence of two subscribing witnesses.

THOMAS TIERNEY.

Witnesses:
   CLARA PROSCHE,
   H. G. BATCHELOR.